Patented Feb. 16, 1937

2,070,603

UNITED STATES PATENT OFFICE 2,070,603

INSECTIFUGE AND INSECTICIDE

Lowell B. Kilgore, Washington, D. C.

No Drawing. Application January 3, 1936, Serial No. 57,457

12 Claims. (Cl. 167—22)

This invention relates to a new composition of matter which is repellent and toxic toward insects, but is neither offensive nor poisonous to warm-blooded animals.

This invention has for its object the production of insecticides and insectifuges comprising synthetic organic chemicals having the highly desirable physiological properties of repelling insects from their presence and of killing insects when contacted thereby. The insecticides and insectifuges which are the subject of the invention disclosed herein comprise an admixture of one or more synthetic organic chemicals with a diluent suitable for their use as an insecticide and as an insectifuge. Furthermore, by combining one or more of the compounds described herein with botanical extractives, themselves toxic to a greater or less degree to insects, the insecticidal and insectifugal values of such extractives are enhanced and stabilized.

Specifically, I have discovered that the members of the class of organic compounds known as delta, epsilon-unsaturated, alpha, gamma, diketo-carboxylic esters, and enol forms thereof (see Beilstein, Handbook of Organic Chemistry, 4th edition, vol. III, pages 763-5, ibid., first supplement, vols. 3-4, page 266), when incorporated in a suitable diluent, produce compositions which possess valuable insecticidal and insectifugal properties. The esters which are the subject of this invention are the product of the Claisen type condensation occurring between a beta, gamma-unsaturated methyl ketone and an ester of oxalic acid by means of metallic sodium. The generic formula for this class of organic chemicals is represented by $$\begin{matrix} R_1 \\ \diagdown \\ \diagup \\ R_2 \end{matrix} C=CH-CO-CH=C(OH)COOR_3 \rightleftarrows \begin{matrix} R \\ \diagdown \\ \diagup \\ R_1 \end{matrix} C=CH-CO-CH_2COCOOR_3$$

alpha form               beta form

This has recently been shown to be a case of ring-chain isomerism rather than one of desmotropism. The beta form shown above probably does not exist but is a dihydropyrone, the equilibrium being represented thus:

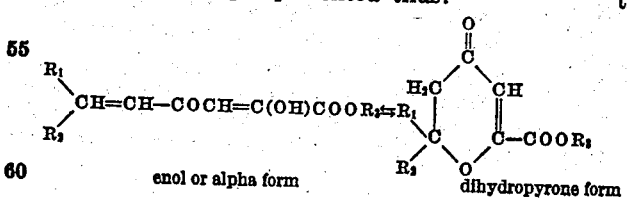

enol or alpha form          dihydropyrone form

See: Dieckmann, Ber., 53B, 1772 (1920); Dieckmann and von Anwers, ibid., 56B, 1527 (1923); Morton and Rogers, J. Chem. Soc., 1926, 713.

However, the earlier nomenclature whereby the compounds are regarded as the beta or keto form is adhered to in this disclosure of my invention. This nomenclature not only conforms to that used in the best known works of reference, but is convenient for identifying the compounds herein disclosed by the components from which they are made.

As an example of what is meant by the nomenclature just referred to and used herein, I may cite the instance where $R_1$, $R_2$, and $R_3$ of the above structural formulae are all methyl radicals, giving according to this nomenclature mesityl-oxide oxalate, methyl ester (see Claisen, Ann. 291, 111 (1890)), represented by:

$$\begin{matrix} CH_3 \\ \diagdown \\ \diagup \\ CH_3 \end{matrix} C=CH-CO-CH_2COCOOCH_3$$

This compound, according to the later evidence (see Dieckmann, etc., supra), actually exists as two isomeric compounds represented by:

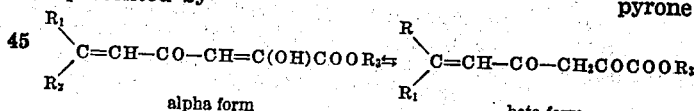

(1)                          (2)
enol or alpha form          dihydropyrone form where (1) is the enol form of mesityl oxide oxalate, methyl ester and (2) is alpha, alpha-dimethyl - alpha prime - carbomethoxy - dihydropyrone. In this particular case it is possible to prepare the isomers (1) and (2) in a pure condition whereby I have found that both are suitable for this invention.

The approximate amount of the enol isomer present in a mixture of the enol and dihydropyrone isomers of a particular member of this series may be determined by titrating a weighed amount of the mixture in an alcoholic solution at 0° C. against standard alkali to a phenophthalein end-point. The dihydropyrone content is then estimated by difference.

The validity of this titration method as a means of determining the amount of each isomer present in a mixture of the two, may be shown by the results obtained using pure, recrystallized isomers of known purity. This is possible in the instance of mesityl oxide oxalate, methyl ester wherein the two isomers can be prepared in a pure condition as shown above. (Claisen, loc. cit.) The results obtained for these pure crystalline isomers together with the results obtained by titrating other members of the series of esters referred to in this invention are shown below. The isomers have not been separated in the latter instances, purification of the samples having been effected by vacuum distillation. Inasmuch as the compounds are regarded as probably existing wholly as sodium enolates in the reaction mixture in which they are produced, their subsequent neutralization presumably produces the enol isomer which is gradually converted to the corresponding dihydropyrone under the influence of heat during their purification by distillation. The composition of this distillate is therefore a mixture of the enol and dihydropyrone forms, the amount of each being dependent upon the character of the substituents as indicated in the general formula for the series:

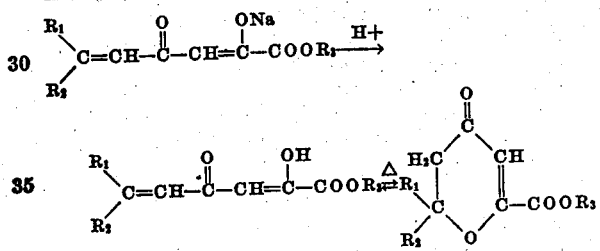

In the instances wherein $R_1=C_6H_5-$ and $R_2=H$ (benzalacetone oxalates), the esters were obtained as solids by direct precipitation from their formation reaction mixtures and were purified by recrystallization when titrated, according to the above procedure these esters appeared to exist wholly in the enol form:

| Compound | Percent enol | Percent dihydropyrone |
|---|---|---|
| Mesityl oxide oxalate, methyl ester (enol.) | 99 | 0 |
| Mesityl oxide oxalate, methyl ester (dihydropyrone) | <1 | 99+ |
| Mesityl oxide oxalate, ethyl ester | 8 | 92 |
| Mesityl oxide oxalate, n-butyl ester | 14 | 86 |
| Mesityl oxide oxalate, iso-amyl ester | 23 | 77 |
| Beta-ionone oxalate, ethyl ester | 83 | 17 |
| Benzalacetone oxalate, n-butyl ester | 103 | 0 |

The efficacy of the members of this series of chemicals, delta, epsilon-unsaturated, alpha, gamma-diketo carboxylic esters and their isomers, as insect repellents is shown by the following experiments designed to test the repellent powers of the chemicals:

Baits suitable for attracting house flies are prepared by coating strips of blotting paper with a glucose syrup. These strips are then individually treated under identical conditions with a spray made by dissolving the chemical, the insectifugal properties of which are to be tested, in deodorized kerosene or a mixture of deodorized kerosene and an auxiliary solvent, such as, acetone. These treated baits together with one which had been treated with the solvent only, are then mounted in a cage of hungry house flies. The arithmetical mean number of flies which feed upon the various baits is then calculated from counts or photographs made at regular intervals.

I have selected a number of representative chemicals of the class of organicals, the delta, epsilon-unsaturated, alpha, gamma-diketo carboxylic esters and their isomers, which I have found to be effective insectifuges from my researches and have given the results obtained by this method in the following Table Number 1.

TABLE NUMBER 1

Insectifuge tests upon house flies by the bait method

| Delta, epsilon-unsaturated, alpha, gamma-diketo ester | Concentration, grams in 100 cc. of kerosene | Aver. no. on sample | Flies feeding on control |
|---|---|---|---|
| Mesityl oxide oxalate, methyl ester, enol isomer | 4 | 29 | 33.3 |
| Mesityl oxide oxalate, methyl ester, dihydropyrone isomer | 4 | 16 | 33.3 |
| Mesityl oxide oxalate, ethyl ester | 2 | 2.4 | 14.7 |
| Mesityl oxide oxalate, normal propyl ester | 4 | 21.2 | 100+ |
| Mesityl oxide oxalate, iso-propyl ester | 4 | 3.6 | 18.7 |
| Mesityl oxide oxalate, normal butyl ester | 4 | 1.4 | 20.9 |
| Mesityl oxide oxalate, secondary butyl ester | 4 | 9.6 | 20.9 |
| Mesityl oxide oxalate, iso-butyl ester | 4 | 2.0 | 20.9 |
| Mesityl oxide oxalate, normal amyl ester | 4 | 2.4 | 20.9 |
| Mesityl oxide oxalate, secondary amyl ester | 4 | 3.5 | 74+ |
| Mesityl oxide oxalate, iso-amyl ester | 4 | 40 | 82 |
| Mesityl oxide oxalate, benzyl ester | 4 | 6.4 | 63 |
| Mesityl oxide oxalate, cyclohexyl ester | 4 | 1.0 | 34.6 |
| Benzal acetone oxalate, ethyl ester | 4 | 1.0 | 2.3 |
| Benzal acetone oxalate, normal butyl ester | 4 | 27.1 | 40 |
| Furfural acetone oxalate, ethyl ester | 4 | 3.3 | 13.4 |
| Crotonal acetone oxalate, ethyl ester | 2 | 0.0 | 4.7 |
| Pseudo-ionone oxalate, ethyl ester | 2 | 0.0 | 4.7 |
| β-Ionone oxalate, ethyl ester | 4 | 13.2 | 18.7 |
| Mesityl oxide oxalate, tetrahydrofurfuryl ester | 2 | 7 | 16. |

TABLE NUMBER 2

Insecticidal tests by the Peet-Grady method using house flies

| Delta, epsilon-unsaturated, alpha, gamma-diketo ester | Conc. gms./ 100 cc. of kerosene | Percent knock down | Percent kill | Distribution sigma | Probable percent kill |
|---|---|---|---|---|---|
| Mesityl oxide oxalate, ethyl ester | 5 | 85 | 42 | 9.6 | 38.8-45.2 |
| Benzal acetone oxalate, ethyl ester | 5 | 38 | 7 | | |
| β-Ionone oxalate, ethyl ester | 5 | 84 | 44 | | |
| Pyrethrum extract, 1 lb./gallon | | 97 | 78 | 9.8 | 75.2-81.4 |
| Same extract+5 percent mesityl oxide oxalate, ethyl ester | | 98 | 89 | 1.2 | 88.9-89.7 |

In addition to the insecticidal tests shown in Table 2, I have tested the following esters by an indirect fog procedure using house flies as the test insect and have found them to be effective insecticides:

Mesityl oxide oxalate, iso-propyl ester
Mesityl oxide oxalate, iso-butyl ester
Mesityl oxide oxalate, normal butyl ester
Mesityl oxide oxalate, cyclohexyl ester
Mesityl oxide oxalate, secondary butyl ester
Mesityl oxide oxalate, normal amyl ester As shown in the tables I have given from my researches both the insectifugal and the insecticidal properties of this class of synthetic esters which vary in value with the character of the individual substituents made in accordance with the generic formula.

While I have in the above description of my invention disclosed a number of preferred and practical embodiments of my invention, it will be understood to those skilled in the art that the scope of the invention is not limited to the substances actually tested, for I have tested a sufficient number of compounds to establish the probability that all compounds of the class indicated will react with more or less efficacy according to the principles herein set forth.

What I claim is:

1. Insectifuge or insecticide comprising a mixture of the enol isomer of a δ,ε-unsaturated-α,γ-diketo carboxylic ester and an ester of an α,α-disubstituted-α'-carboxydihydro-γ-pyrone of the general formula:

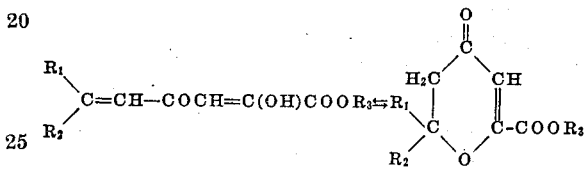

wherein $R_1$ and $R_2$ are either the same or different organic radicals or respectively one organic radical and one hydrogen atom, and $R_3$ is any organic radical or group forming an ester of the carboxyl group.

2. An insectifuge or insecticide comprising a δ,ε-unsaturated-α,γ-diketo carboxylic ester of the general formula,

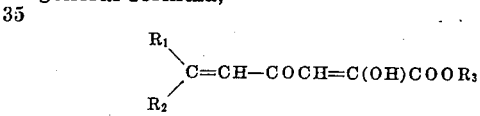

the same being the enol tautomer of the corresponding diketo ester, and wherein $R_1$ and $R_2$ are either the same or different organic radicals, or respectively, one organic radical and one hydrogen atom, and wherein $R_3$ is any organic radical forming an ester with the carboxyl group.

3. An insectifuge or insecticide comprising an ester of an α,α-disubstituted-α'-carboxy-dihydro-γ-pyrone of the general formula,

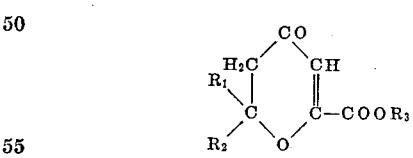

wherein $R_1$ and $R_2$ are either the same or different organic radicals, or respectively, one organic radical and one hydrogen atom, and $R_3$ is any organic radical forming an ester with the carboxyl group.

4. An insectifuge or insecticide comprising a synthetic ester selected from the group consisting of: mesityl oxide oxalate, methyl ester; mesityl oxide oxalate, ethyl ester; mesityl oxide oxalate, normal propyl ester; mesityl oxide oxalate, iso-propyl ester; mesityl oxide oxalate, normal butyl ester; mesityl oxide oxalate, secondary butyl ester; mesityl oxide oxalate, iso-butyl ester; mesityl oxide oxalate, normal amyl ester; mesityl oxide oxalate, secondary amyl ester; mesityl oxide oxalate, iso-amyl ester; mesityl oxide oxalate, benzyl ester; mesityl oxide oxalate, cyclohexyl ester; mesityl oxide oxalate, tetrahydrofurfuryl ester; benzal acetone oxalate, ethyl ester; benzal acetone oxalate, normal butyl ester; furfural acetone oxalate, ethyl ester; crotonal acetone oxalate, ethyl ester; pseudo-ionone oxalate, ethyl ester; β-ionone oxalate, ethyl ester.

5. An insectifuge or insecticide comprising in solution, a mixture of the enol isomer of a δ,ε-unsaturated-α,γ-diketo carboxylic ester and an ester of an α,α-disubstituted-α'-carboxydihydro-γ-pyrone of the general formula:

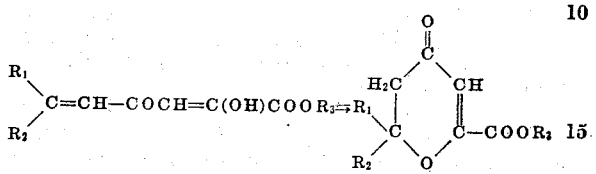

wherein $R_1$ and $R_2$ are either the same or different organic radicals or respectively one organic radical and one hydrogen atom, and $R_3$ is any organic radical or group forming an ester of the carboxyl group.

6. An insectifuge or insecticide comprising in solution, a δ,ε-unsaturated-α,γ-diketo carboxylic ester of the general formula,

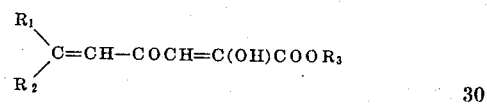

the same being the enol tautomer of the corresponding diketo ester, and wherein $R_1$ and $R_2$ are either the same or different organic radicals, or respectively one organic radical and one hydrogen atom, and wherein $R_3$ is any organic radical forming an ester with the carboxyl group.

7. An insectifuge or insecticide comprising in solution, an ester of the α',α-disubstituted, δ'carboxydihydro-γ-pyrone of the general formula,

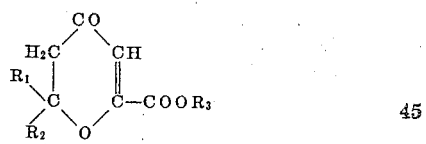

wherein $R_1$ and $R_2$ are either the same or different organic radicals, or respectively one organic radical and one hydrogen atom, and $R_3$ is any organic radical forming an ester with the carboxyl group.

8. An insectifuge or insecticide comprising in solution, a synthetic ester selected from the group consisting of: mesityl oxide oxalate, methyl ester, enol isomer; mesityl oxide oxalate, methyl ester, dihydropyrone isomer; mesityl oxide oxalate, ethyl ester; mesityl oxide oxalate, normal propyl ester; mesityl oxide oxalate, iso-propyl ester; mesityl oxide oxalate, normal butyl ester; mesityl oxide oxalate, secondary butyl ester; mesityl oxide oxalate, iso-butyl ester; mesityl oxide oxalate, normal amyl ester; mesityl oxide oxalate, secondary amyl ester; mesityl oxide oxalate, iso-amyl ester; mesityl oxide oxalate, benzyl ester; mesityl oxide oxalate, cyclohexyl ester; mesityl oxide oxalate, tetrahydrofurfuryl ester; benzal acetone oxalate, ethyl ester; benzal acetone oxalate, normal butyl ester; furfural acetone oxalate, ethyl ester; crotonal acetone oxalate, ethyl ester; pseudo-ionone oxalate, ethyl ester; β-ionone ethyl ester.

9. An insectifuge or insecticide in solution, of a strength of from 2 to 5 percent of a mixture of the enol isomer of a δ,ε-unsaturated,α,γ-diketo carboxylic ester and an ester of an α,α- disubstituted-α'-carboxydihydro-γ-pyrone of the general formula:

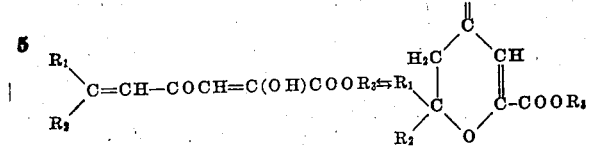

wherein $R_1$ and $R_2$ are either the same or different organic radicals or respectively one organic radical and one hydrogen atom, and $R_3$ is any organic radical or group forming an ester of the carboxyl group.

10. An insectifuge or insecticide comprising in solution of a strength of from 2 to 5 percent of a δ,ε-unsaturated-α,γ-diketo carboxylic ester of the general formula:

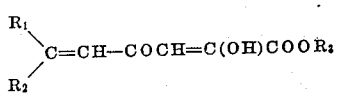

the same being the enol tautomer of the corresponding diketo ester, and wherein $R_1$ and $R_2$ are either the same or different organic radicals, or respectively one organic radical and one hydrogen atom, and wherein $R_3$ is any organic radical forming an ester with the carboxyl group.

11. An insectifuge or insecticide comprising in solution of a strength of from 2 to 5 percent of an ester of an α',α-disubstituted, δ'carboxy-dihydro-γ-pyrone of the general formula,

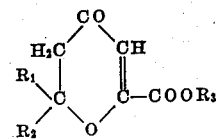

wherein $R_1$ and $R_2$ are either the same or different organic radicals, or respectively one organic radical and one hydrogen atom, and $R_3$ is any organic radical forming an ester with the carboxyl group.

12. An insectifuge or insecticide comprising in solution of a strength of from 2 to 5 percent of synthetic ester selected from the group consisting of: mesityl oxide oxalate, methyl ester, enol isomer; mesityl oxide oxalate, methyl ester, dihydropyrone isomer; mesityl oxide oxalate, ethyl ester; mesityl oxide oxalate, normal propyl ester; mesityl oxide oxalate, iso-propyl ester; mesityl oxide oxalate, normal butyl ester; mesityl oxide oxalate, secondary butyl ester; mesityl oxide oxalate, iso-butyl ester; mesityl oxide oxalate, normal amyl ester; mesityl oxide oxalate, secondary amyl ester; mesityl oxide oxalate, iso-amyl ester; mesityl oxide oxalate, benzyl ester; mesityl oxide oxalate, cyclohexyl ester; mesityl oxide oxalate, tetrahydrofurfuryl ester; benzal acetone oxalate, ethyl ester; benzal acetone oxalate, normal butyl ester; furfural acetone oxalate, ethyl ester; crotonal acetone oxalate, ethyl ester; pseudo-ionone oxalate, ethyl ester; β-ionone oxalate, ethyl ester.

LOWELL B. KILGORE.